US012168377B2

(12) United States Patent
Panigrahi et al.

(10) Patent No.: US 12,168,377 B2
(45) Date of Patent: Dec. 17, 2024

(54) STAIR CLIMBING ROBOTIC VEHICLE

(71) Applicant: Ford Global Technologies, LLC, Dearborn, MI (US)

(72) Inventors: Smruti Panigrahi, Farmington Hills, MI (US); Kurt Lundeen, Novi, MI (US); Sanghyun Hong, Ann Arbor, MI (US); Yifan Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 336 days.

(21) Appl. No.: 17/815,837

(22) Filed: Jul. 28, 2022

(65) Prior Publication Data

US 2024/0034117 A1 Feb. 1, 2024

(51) Int. Cl.
*B60K 1/00* (2006.01)
*B60G 17/016* (2006.01)
*B60P 1/36* (2006.01)
*B62D 21/14* (2006.01)
*B62D 57/024* (2006.01)

(52) U.S. Cl.
CPC .............. *B60G 17/016* (2013.01); *B60K 1/00* (2013.01); *B60P 1/36* (2013.01); *B62D 21/14* (2013.01); *B62D 57/024* (2013.01)

(58) Field of Classification Search
CPC . B60G 17/016; B60K 1/00; B60P 1/36; B60P 1/006; B62D 21/14; B62D 57/024; B62D 61/12; B62D 63/02; B62D 63/04; B60W 30/18009
See application file for complete search history.

(56) References Cited

U.S. PATENT DOCUMENTS 10,800,221 B2 10/2020 Liivik et al.
11,148,696 B2 * 10/2021 Malghan .............. B62D 57/024
(Continued)

FOREIGN PATENT DOCUMENTS

CN 214520233 U 10/2021
DE 102018204187 A1 9/2019

OTHER PUBLICATIONS

Ford, A Smart Little Robot That Can Help Make Deliveries, Autonomous Vehicle Robot Delivery, 2020, 1-7.
(Continued)

*Primary Examiner* — Lynn E Schwenning
*Assistant Examiner* — Lucia Elba Rodriguez
(74) *Attorney, Agent, or Firm* — Emily Drake; Eversheds Sutherland (US) LLP

(57) ABSTRACT

The disclosure generally pertains to a robotic vehicle. An example robotic vehicle has a base platform that includes at least a chassis, an actuator, a sensor, and a controller. The chassis includes a first wheel that is attached to a first section of the chassis and further includes a second wheel attached to a second section of the chassis. The actuator has a proximal end attached to the first section of the chassis and a distal end attached to the second section of the chassis. The sensor is configured to obtain information associated with a stair structure located on a traversal path of the robotic vehicle. The controller evaluates the information obtained by the sensor and operates the actuator to vary a separation distance between the first section of the chassis and the second section of the chassis so as to enable the robotic vehicle to traverse the stair structure.

7 Claims, 13 Drawing Sheets

(56) References Cited

U.S. PATENT DOCUMENTS

| | | | |
|---|---|---|---|
| 2022/0308586 A1* | 9/2022 | Bergman | G05D 1/0088 |
| 2023/0001956 A1* | 1/2023 | Langenfeld | B60P 1/6436 |
| 2023/0322038 A1* | 10/2023 | Zavadsky | B60G 11/04 |
| | | | 280/5.514 |
| 2024/0181805 A1* | 6/2024 | Lee | B60B 15/16 |

OTHER PUBLICATIONS

Gavin Phillips, How do Delivery Robots Work? How They Safely Deliver Your Packages, Aug. 19, 2020, 1-15.

* cited by examiner

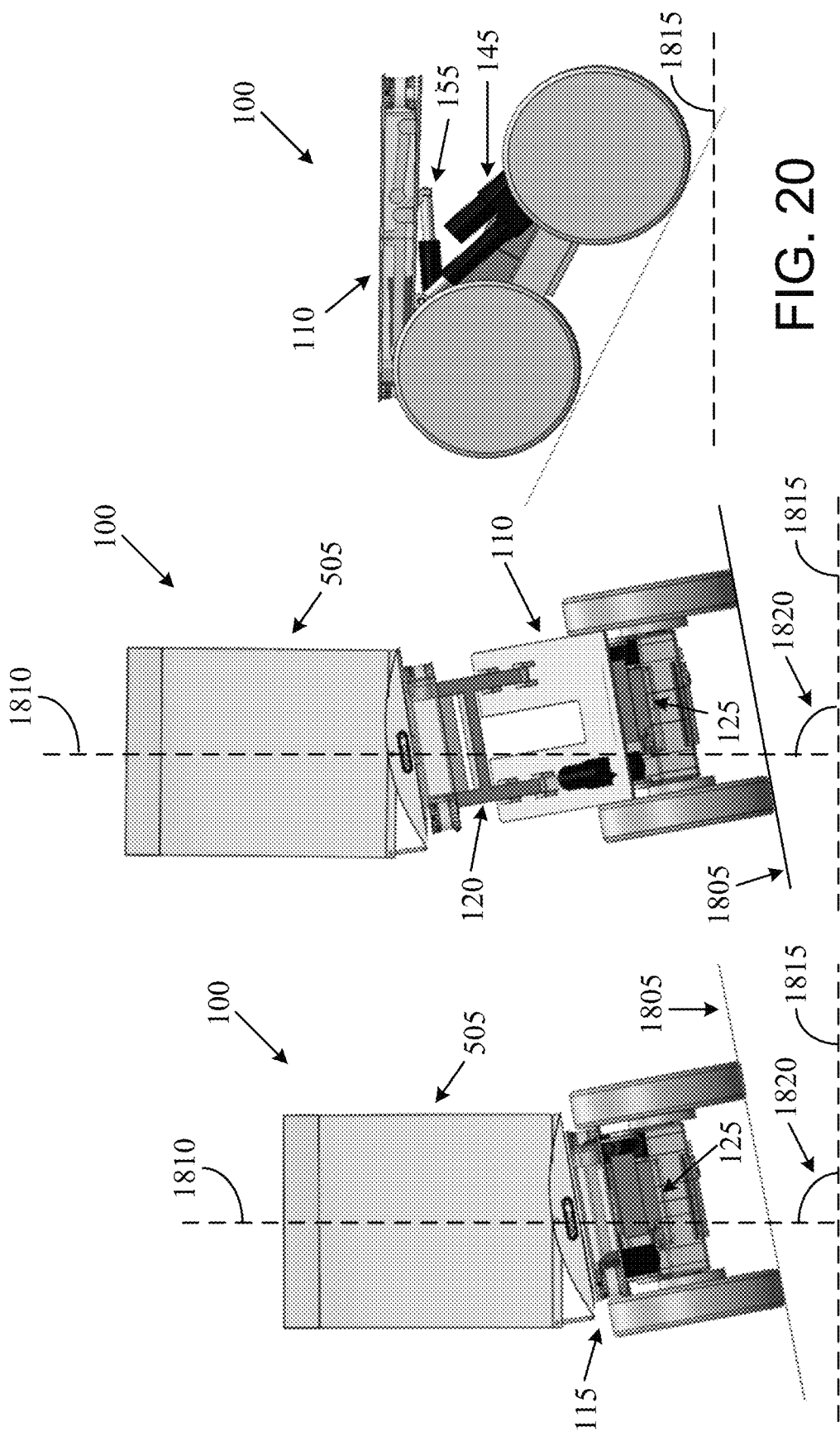

STAIR CLIMBING ROBOTIC VEHICLE

BACKGROUND

Terrestrial robots, particularly package carrying terrestrial robots, face many challenges when traversing various types of obstacles on a travel path. It is desirable to address at least some of these challenges.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 17B shows an actuator that may be operated under control of a controller in accordance with an embodiment of the disclosure.

FIG. 17C shows the pair of flippers in an unactuated condition.

FIG. 17D shows the pair of flippers rotated in a counter-clockwise direction in an example actuated condition.

FIG. 17E shows the pair of flippers further rotated in a counter-clockwise direction in another example actuated condition.

FIG. 17F shows the pair of flippers rotated in a clock-wise back to the unactuated position after the robotic vehicle has moved forwards.

FIG. 18 illustrates a tilting feature that may be provided by the robotic vehicle in accordance with an embodiment of the disclosure.

FIG. 19 illustrates another tilting feature that may be provided by the robotic vehicle in accordance with an embodiment of the disclosure.

FIG. 20 illustrates yet another tilting feature that may be provided by the robotic vehicle in accordance with an embodiment of the disclosure.

DETAILED DESCRIPTION

Overview

Figure 1:
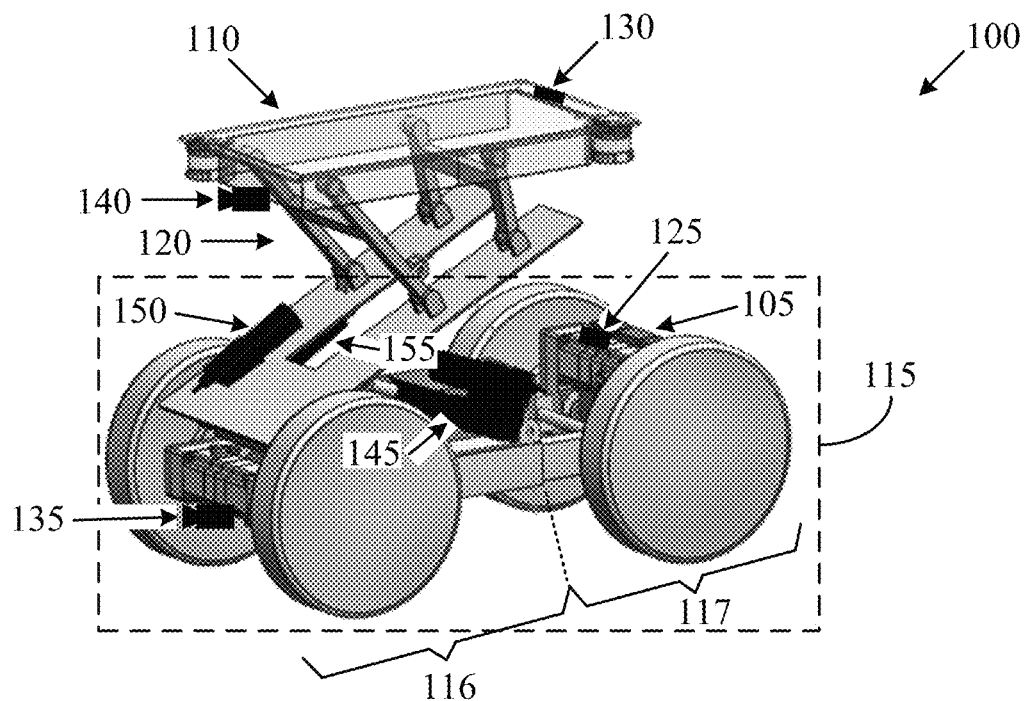
FIG. 1 provides a first isometric view of an example robotic vehicle in accordance with a first embodiment of the disclosure.

The disclosure generally pertains to a robotic vehicle, particularly a terrestrial robotic vehicle that can traverse various types of obstacles when performing tasks such as, for example, delivering packages. In an example embodiment, a robotic vehicle has a base platform that includes at least a chassis, an actuator, a sensor, and a controller. The chassis includes a first wheel that is attached to a first section of the chassis and further includes a second wheel attached to a second section of the chassis. The actuator has a proximal end attached to the first section of the chassis and a distal end attached to the second section of the chassis. The sensor is configured to obtain information associated with a stair structure located on a traversal path of the robotic vehicle. The controller evaluates the information obtained by the sensor and operates the actuator to vary a separation distance between the first section of the chassis and the second section of the chassis so as to enable the robotic vehicle to traverse the stair structure.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionalities described with respect to a particular device or component may be performed by another device or component. For example, some or all of the functionalities described herein with respect to a personal device may, in certain embodiments, be performed by a vehicle controller and/or another component of a vehicle. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the phrase "robotic vehicle" as used in this disclosure can pertain to any of various types of terrestrial robots. A delivery robot is merely one example of a "robotic vehicle" in accordance with the disclosure and the description provided herein is equally relevant to, for example, a robot used in space exploration, a robot used in a disaster area (earthquake, war, accident, bomb-disposal, etc.), a robot used for doing household chores (such as, for example, floor cleaning and/or vacuuming), a robot used for delivering mail in an office, and a robot used for operations such as lawn mowing, clearing land, digging the earth, etc.

It must be understood that words such as "implementation," "application," "scenario," "case," and "situation" as used herein represent abbreviated versions of the phrase "In an example ("implementation," "application," "scenario," "case," "approach," and "situation") in accordance with the disclosure." It must also be understood that the word "example" as used herein is intended to be non-exclusionary and non-limiting in nature.

FIG. 1 provides a first isometric view of an example robotic vehicle 100 in accordance with a first embodiment of the disclosure. The robotic vehicle 100 is illustrated in the form of a four-wheeled battery-powered vehicle, but it must be understood that the description provided herein is equally applicable to other types of robotic vehicles that use other types of mechanical components for moving over terrain (treads, chains, belts, legs, stilts, etc.) and other types of drive systems (such as, for example, a gasoline internal combustion engine (ICE), a diesel engine, a diesel engine, or a natural gas-powered combustion engine coupled to a transmission, a drive shaft, a differential, etc.).

The example robotic vehicle 100, which can include a battery EV (BEV) drive system powered by a battery pack 105, is generally configured for transporting one or more packages. In the illustrated example, the robotic vehicle 100 includes a chassis 115 having a first section 116 that is movably coupled to a second section 117. A first pair of wheels are attached to the first section 116 and a second pair of wheels are attached to the second section 117. In other embodiments, less than four wheels may be present and treads, belts, legs, stilts, etc. may be included in place of, or in addition to, the four wheels indicated in this example embodiment.

Various components may be provided on the chassis 115 such as, for example, a first controller 125, a motor system, and one or more sensors. The first controller 125 includes a first processor (not shown) and a first memory (not shown). The first memory may be a non-transitory computer-readable memory that stores computer-executable instructions. The computer-executable instructions can be provided in the form of a software application that is executed by the first processor to cause the robotic vehicle 100 to perform various operations in accordance with the disclosure. The motor system can include one or more motors that drive the wheels of the robotic vehicle 100. The sensor(s) can be any of various devices such as, for example, a video camera, a still camera, a radar device, a sonar device, or a light detection and ranging (LIDAR) device.

In the illustrated example, the sensor is a camera 135. The camera 135 is arranged to capture images of objects located ahead of the robotic vehicle 100. In another embodiment, one or more cameras may be arranged to capture images of objects located in various other directions with respect to the robotic vehicle 100 (back, sides, etc.). In yet another embodiment, the sensor can be a radar device, a sonar device, and/or a LIDAR device arranged to obtain information (presence, distance, movement, etc.) of objects located in various directions with respect to the robotic vehicle 100 (front, back, sides, and/or a ground surface).

A dual-functionality deck 110 can be mounted upon the chassis 115. In an example implementation, a four-bar linkage assembly 120 is provided for mounting the dual-functionality deck 110 upon the chassis 115. In a first example application the dual-functionality deck 110 can be used for transporting one or more packages that may be placed upon a top major surface of the dual-functionality deck 110. In another example application the dual-functionality deck 110 can be used as a smart lid that can be used to cover a package housing module (not shown) and to perform various functions associated with a package housing module.

A second controller 130 can be provided in the dual-functionality deck 110. The second controller 130 can include a second processor (not shown) and a second memory (not shown). The second memory may be a non-transitory computer-readable memory that stores computer-executable instructions. The computer-executable instructions can be provided in the form of a software application that is executed by the second processor to perform various operations in accordance with the disclosure. The operations can be executed, for example, when the dual-functionality deck 110 is operative as a smart lid placed upon a package housing module (not shown). Some example operations can include, measuring a laden weight of the dual-functionality deck 110 when a package is placed upon the dual-functionality deck 110, and providing a warning (a beep, a displayed message, etc.) when the laden weight exceeds a threshold weight.

One or more sensors may be provided in the dual-functionality deck 110. The sensor(s) can be any of various devices such as, for example, a video camera, a still camera, a radar device, a sonar device, or a LIDAR device. Though illustrated as a camera 140 that is pointing forwards in the robotic vehicle 100, one or more sensors may be arranged to provide information about various objects that may be present at various locations in the vicinity of the robotic vehicle 100 (front, back, sides, and ground surface).

A proximal end of the four-bar linkage assembly 120 is attached to a top surface of the first section of the chassis 115. A distal end of the four-bar linkage assembly 120 is removably attached to a bottom surface of the dual-functionality deck 110. The four-bar linkage assembly 120 is arranged to allow the first controller 125 to raise, lower, and/or tilt the dual-functionality deck 110. The raising, lowering, and/or tilting operations can be carried out by the first controller 125 based on transmitting control signals to one or more actuators such as, for example, a first actuator 145, a second actuator 155, and/or a third actuator 150. In an example application, the four-bar linkage assembly 120 allows the first controller 125 to raise or lower the dual-functionality deck 110 while continuously maintaining a top major surface of the dual-functionality deck 110 in a parallel orientation with respect to a ground surface on which the robotic vehicle 100 is either standing or moving.

Figure 2:
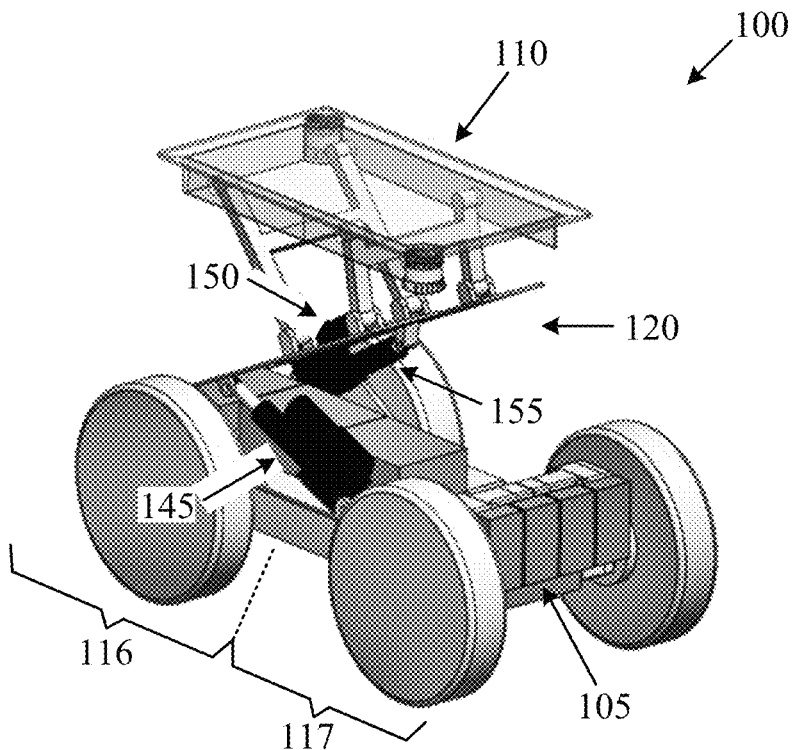
FIG. 2 provides a second isometric view of the robotic vehicle illustrated in FIG. 1.

FIG. 2 provides a second isometric view of the robotic vehicle 100. As illustrated in this second isometric view, a proximal end of the first actuator 145 is attached to a top surface of the second section 117 of the chassis 115. A distal end of the first actuator 145 is attached to a bottom surface of the four-bar linkage assembly 120.

As further illustrated in this second isometric view, the second actuator 155 is laterally offset with respect to the first actuator 145. More particularly, a proximal end of the second actuator 155 is attached to a top surface of the first section 116 of the chassis 115 and a distal end of the second actuator 155 is attached to the bottom surface of the dual-functionality deck 110.

The angular orientation of the first actuator 145 with respect to the second actuator 155 can be approximated by an x-shape, whereby the first actuator 145 may be actuated to raise (or to lower) a first end of the four-bar linkage assembly 120 and the second actuator 155 may be actuated to raise (or to lower) an opposing end of the four-bar linkage assembly 120. The x-shape arrangement enables the first controller 125 to operate the four-bar linkage assembly 120 for tilting the dual-functionality deck 110 at various angles.

Figure 3:
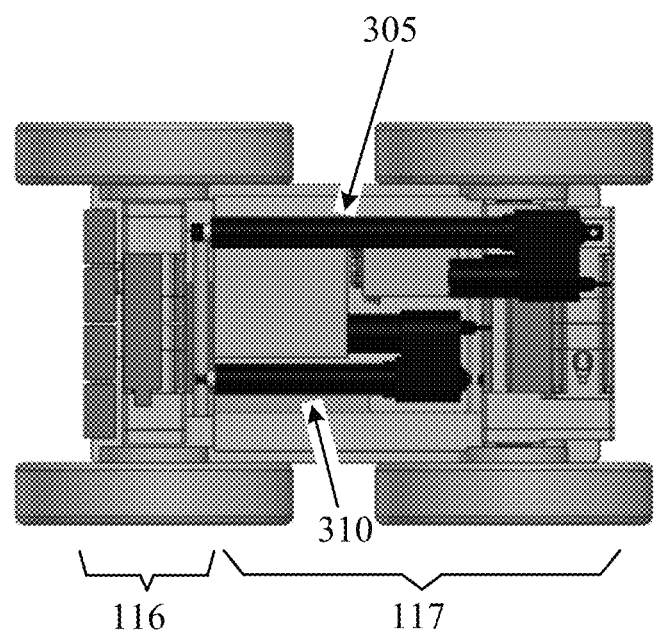
FIG. 3 shows a first underside view of the robotic vehicle when placed in a first operating condition in accordance with an embodiment of the disclosure.

FIG. 3 shows a first underside view of the robotic vehicle 100 when placed in a first operating condition in accordance with an embodiment of the disclosure. In this example embodiment, the robotic vehicle 100 further includes a fourth actuator 305 and a fifth actuator 310. A proximal end of each of the fourth actuator 305 and the fifth actuator 310 is attached to a portion of the first section 116 of the robotic vehicle 100. A distal end of each of the fourth actuator 305 and the fifth actuator 310 is attached to a portion of the second section 117 of the robotic vehicle 100. In the illustrated example embodiment, the fourth actuator 305 is located coplanar with the fifth actuator 310. In other embodiments, the fourth actuator 305 and the fifth actuator 310 may be arranged in various other configurations and/or one of the fourth actuator 305 or the fifth actuator 310 may be omitted. When placed in the first operating condition, each of the fourth actuator 305 and the fifth actuator 310 is in a retracted state. The retracted state can be as a result of the first controller 125 (not shown) refraining from providing an actuation signal to each of the fourth actuator 305 and the fifth actuator 310.

Figure 4:
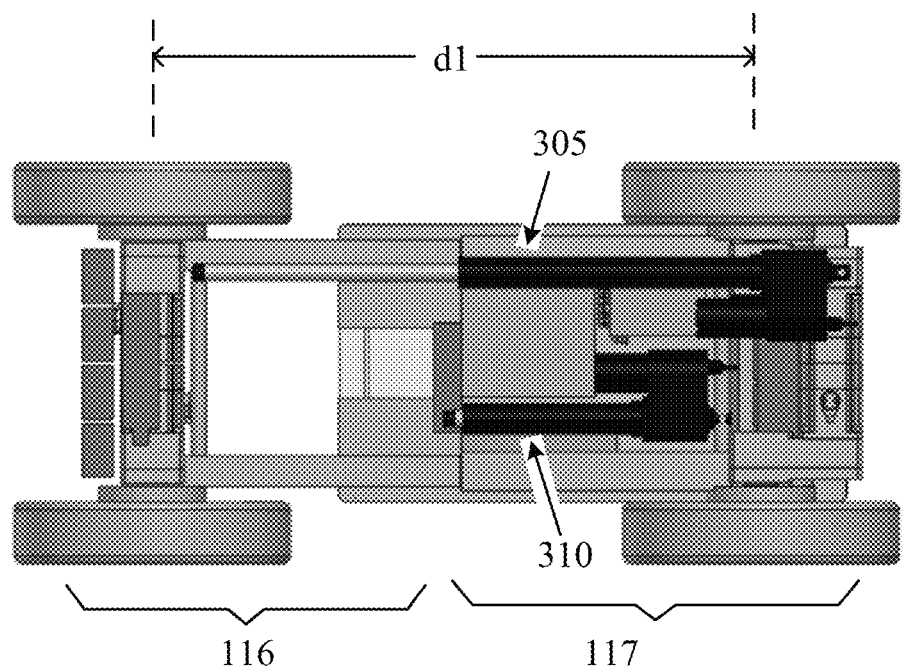
FIG. 4 shows a second underside view of the robotic vehicle when placed in a second operating condition in accordance with an embodiment of the disclosure.

FIG. 4 shows a second underside view of the robotic vehicle 100 when placed in a second operating condition in accordance with an embodiment of the disclosure. A transition from the first operating condition (described above) to the second operating condition can be executed by the first controller 125 (not shown) transmitting an actuation signal to the fourth actuator 305 and/or the fifth actuator 310. In the example illustration, the first controller 125 has provided an actuation signal to the fourth actuator 305. Actuation of the fourth actuator 305 causes the first section 116 to move apart from the second section 117. Moving apart leads to an increase in a separation distance between the first section 116 and the second section 117.

The separation distance may vary, for example, from substantially zero when in a retracted condition (as illustrated in FIG. 3) to a separation distance "d1" when in an extended condition (as illustrated in FIG. 4). Increasing the separation distance between the first section 116 and the second section 117 leads to an increase in the separation distance "d1" between the first pair of wheels that are attached to the first section 116 and the second pair of wheels that are attached to the second section 117 (separation distance "d1"). Increasing the separation distance between the first pair of wheels and the second pair of wheels increases a longitudinal dimension of the chassis 115 and provides various advantages, such as, for example, enables the robotic vehicle 100 climb stairs in the manner described below. Conversely, decreasing the separation distance between the first pair of wheels and the second pair of wheels decreases the longitudinal dimension of the chassis 115 and provides various advantages, such as, for example, increased maneuverability.

Figure 5:
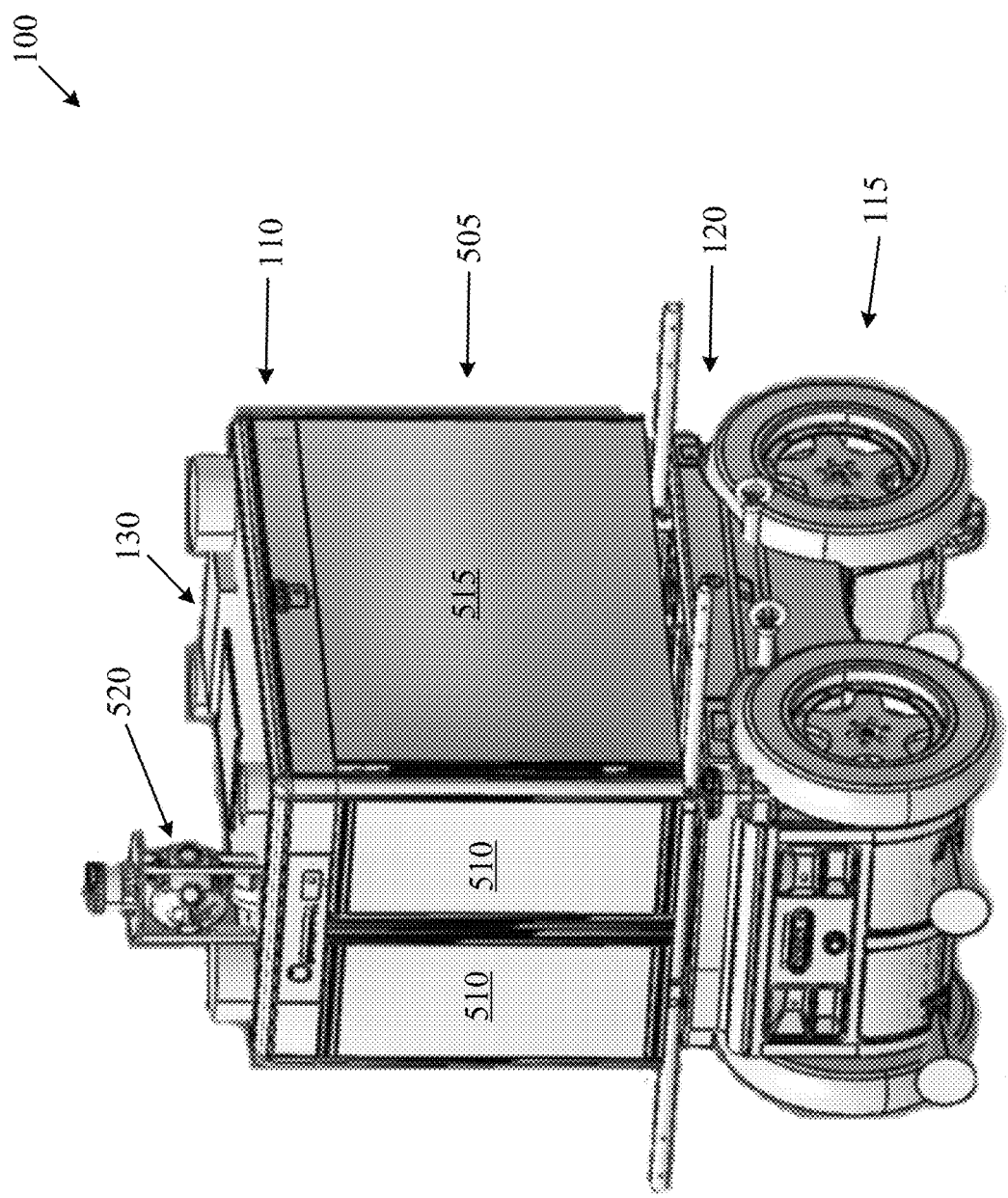
FIG. 5 provides an isometric view of the robotic vehicle configured in accordance with a second embodiment of the disclosure.

FIG. 5 provides an isometric view of the robotic vehicle 100 configured in accordance with a second embodiment of the disclosure. In this second embodiment, the dual-functionality deck 110 is used as a lid to cover a package housing module 505. The dual-functionality deck 110 can include various components such as, for example, a camera 520 that provides a 360° field of view for capturing images and/or video that can be conveyed to the second controller 130. The second controller 130 may evaluate the images and/or video for various purposes such as, for example, to avoid obstacles, to traverse obstacles, and to navigate a travel path.

In other embodiments, the camera 520 may be replaced or augmented with other sensors such as, for example, a video camera, a radar device, a sonar device, or a LIDAR device. Such devices can be configured to provide various types of information to the second controller 130, including, for example, information pertaining to the contents of the package housing module 505.

The package housing module 505 is configured to house one or more packages that can be transported by the robotic vehicle 100. In the illustrated example, the package housing module 505 includes a display screen 515 and a pair of doors 510 (a single door can be used in other embodiments). The display screen 515 can be used by the second controller 130 and/or the first controller 125 for various purposes such as, for example, to provide information about one or more packages that may be present inside the package housing module 505 (an image of a package, for example), a travel route of the robotic vehicle 100, package recipient information (name, address, phone number, etc.), scheduling information (various times), delivery information (time of delivery, proof of delivery, etc.), and as a customer user interface. The customer user interface can be used by a customer (or any other individual) for obtaining information (such as the example information described above). In some applications, access to the information via the customer user interface may be password protected.

The pair of doors 510 can be placed in a closed/locked condition or in an open condition by the second controller 130. The second controller 130 can actuate components (not shown) such as, for example, relay, latches, and actuators, to place the pair of doors 510 in the closed/locked condition at times other than when a package is to be retrieved and can unlock/open the pair of doors 510 when, for example, an authorized customer is allowed to retrieve a package that is stored in the package housing module 505 and transported by the robotic vehicle 100.

Figure 6:
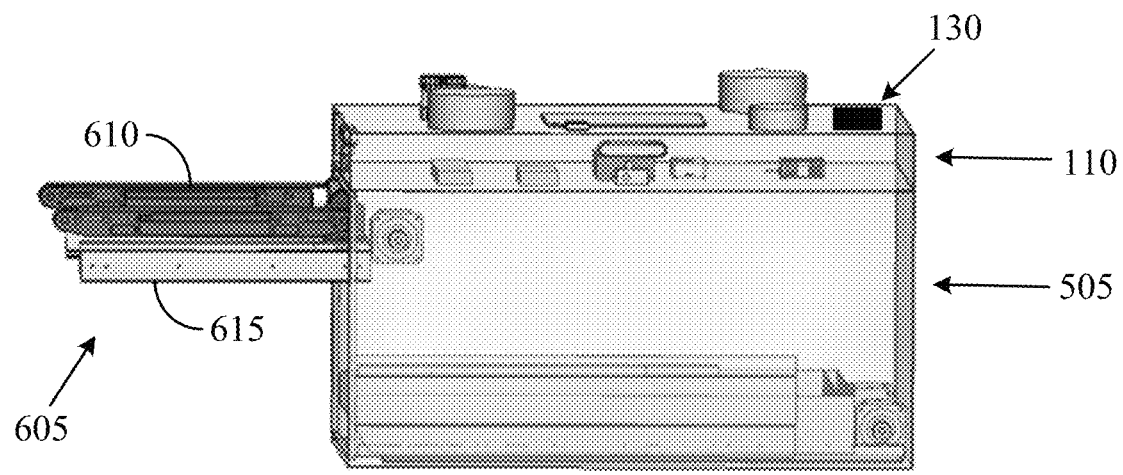
FIG. 6 shows a first example embodiment of a package housing module that can be a part of the robotic vehicle in accordance with an embodiment of the disclosure

FIG. 6 shows a first example embodiment of the package housing module 505 that can be a part of the robotic vehicle 100 in accordance with an embodiment of the disclosure. In this embodiment, the package housing module 505 includes a package loader assembly 605. The package loader assembly 605 may include a slide-out conveyor 615 and/or a conveyor belt assembly 610. The second controller 130 can control various operations of the package loader assembly 605 such as, for example, placing the package loader assembly 605 in a retracted condition inside the package housing module 505 when the robotic vehicle 100 is moving, or placing the package loader assembly 605 in an extended condition (as illustrated) so to allow for placement of a package inside the package housing module 505 when the robotic vehicle 100 is stationary.

Figure 7:
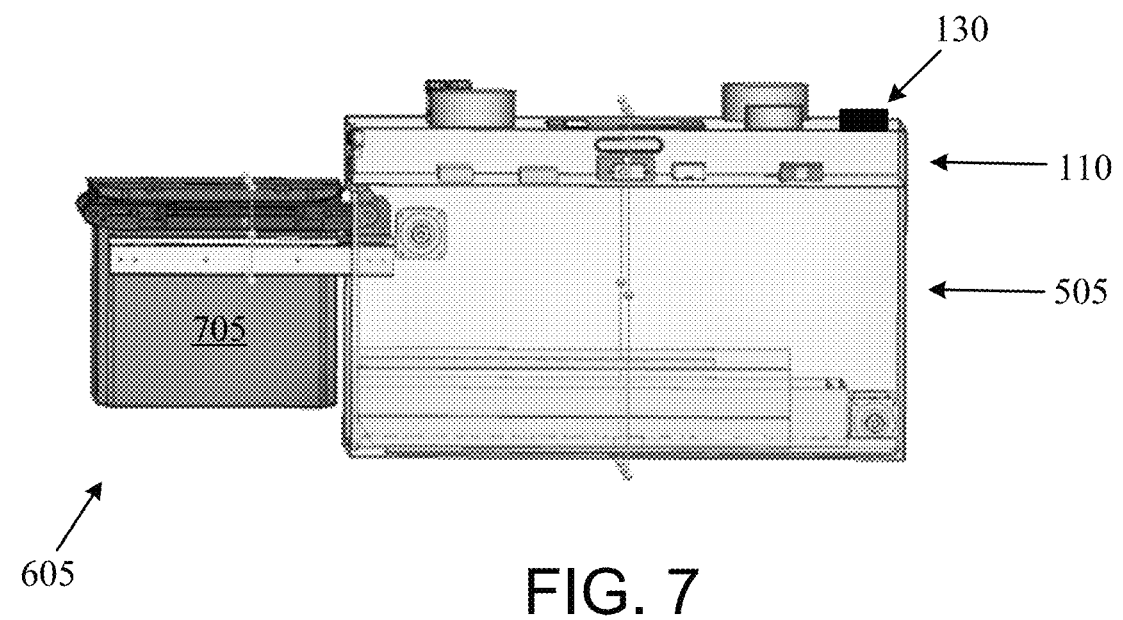
FIG. 7 shows a package loader assembly placed in an extended condition for loading a bin into a package housing module in accordance with an embodiment of the disclosure.

FIG. 7 shows the package loader assembly 605 placed in an extended condition for loading a bin 705 into the package housing module 505 in accordance with an embodiment of the disclosure. The bin 705 may be used for storing one or more packages (small items, for example) in the package housing module 505.

Figure 8:
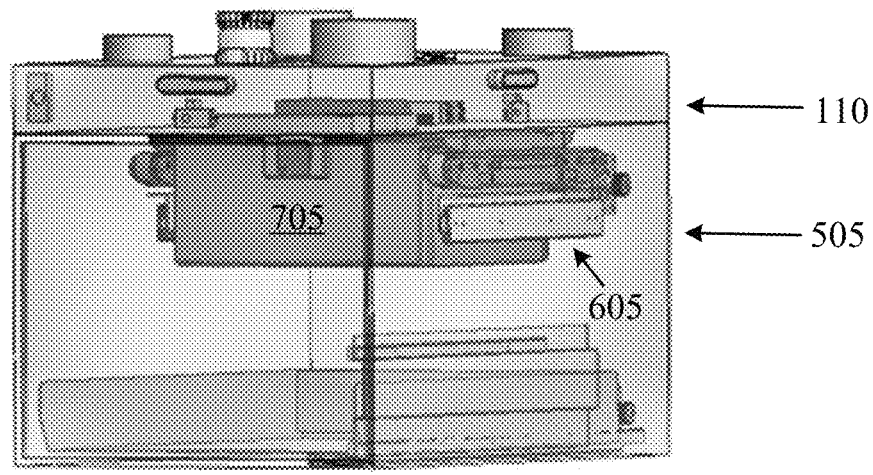
FIG. 8 shows the package loader assembly placed in a retracted condition for transporting a first type of bin in the package housing module in accordance with an embodiment of the disclosure.

FIG. 8 shows the package loader assembly 605 placed in a retracted condition for transporting the bin 705 in the package housing module 505 in accordance with an embodiment of the disclosure.

Figure 9:
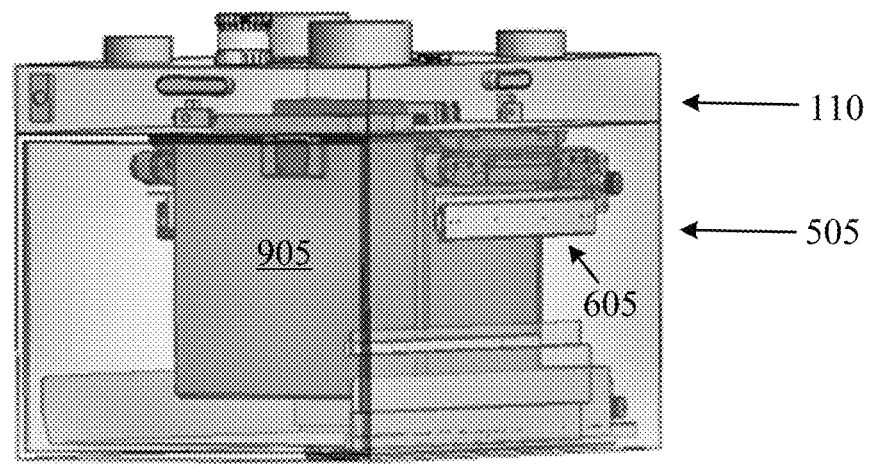
FIG. 9 shows the package loader assembly placed in a retracted condition for transporting a second type of bin in the package housing module in accordance with an embodiment of the disclosure.

FIG. 9 shows the package loader assembly 605 placed in a retracted condition for transporting a bin 905 in the package housing module 505 in accordance with an embodiment of the disclosure. The bin 905, which is larger in size than the bin 705 shown in FIG. 7 and FIG. 8, may be used for storing a larger number of items or items of larger size than can be accommodated in the bin 705.

Figure 10:
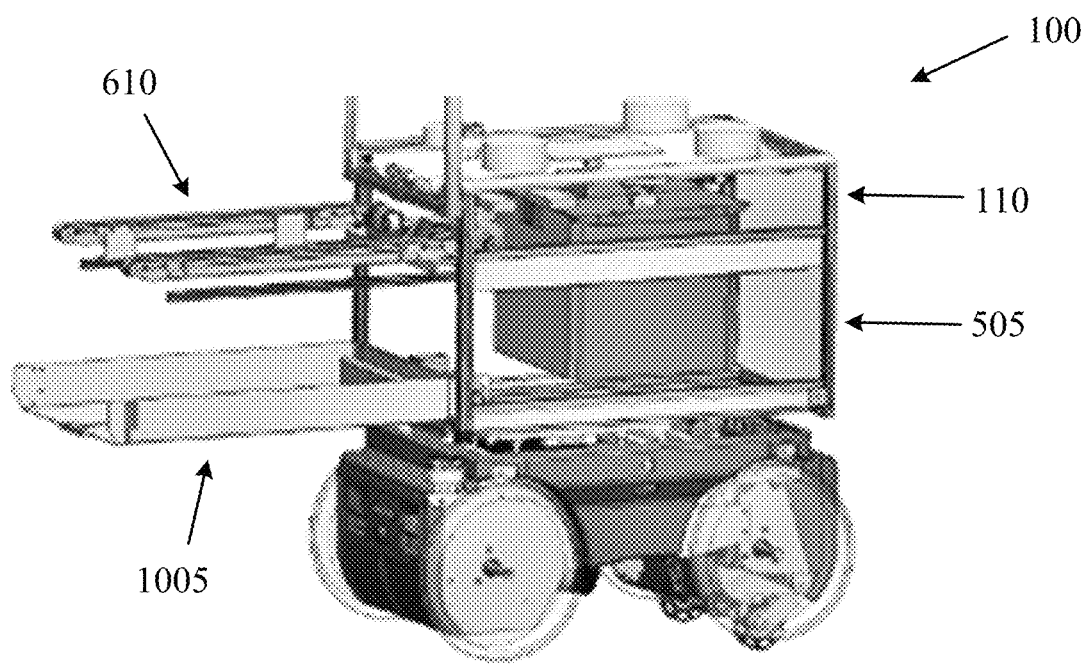
FIG. 10 shows a second example embodiment of a package housing module that can be a part of the robotic vehicle in accordance with the disclosure.

FIG. 10 shows a second example embodiment of the package housing module 505 that can be a part of the robotic vehicle 100 in accordance with the disclosure. In this embodiment, the package housing module 505 includes a tray 1005, in addition to at least some parts of the package loader assembly 605 described above. The tray 1005 can be used for various purposes such as, for example, transporting a package (without loading into the package housing module 505) and/or delivering a package (not shown) that may have been placed upon the tray 1005 or inside the package housing module 505.

Figure 11:
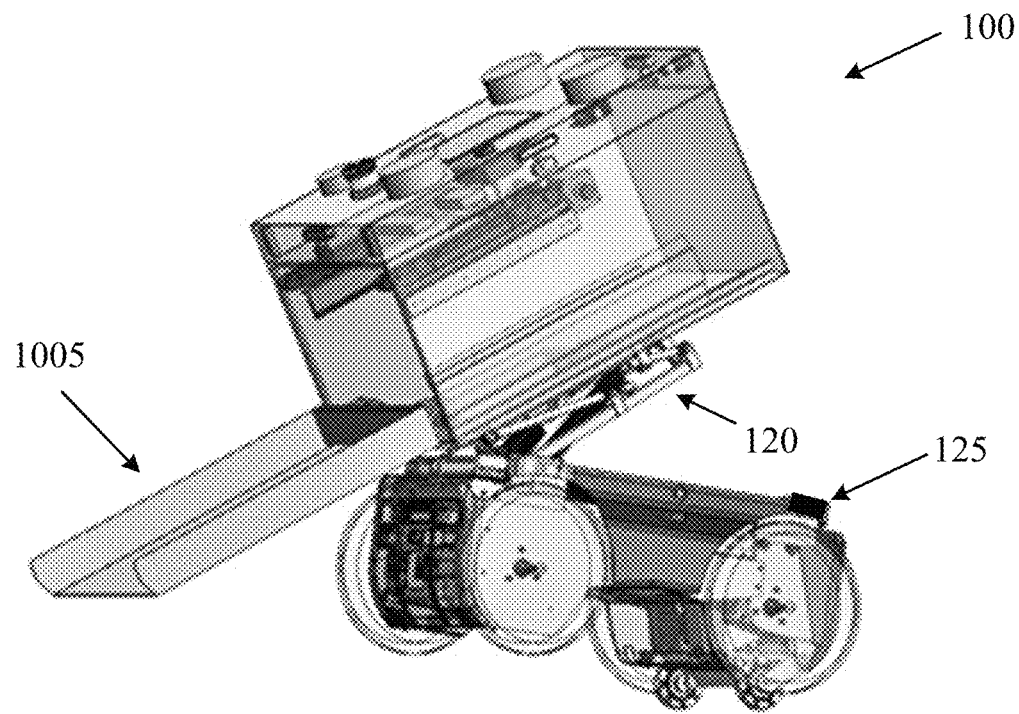
FIG. 11 illustrates a first example operation of the robotic vehicle when delivering a package in accordance with the disclosure.
Figure 12:
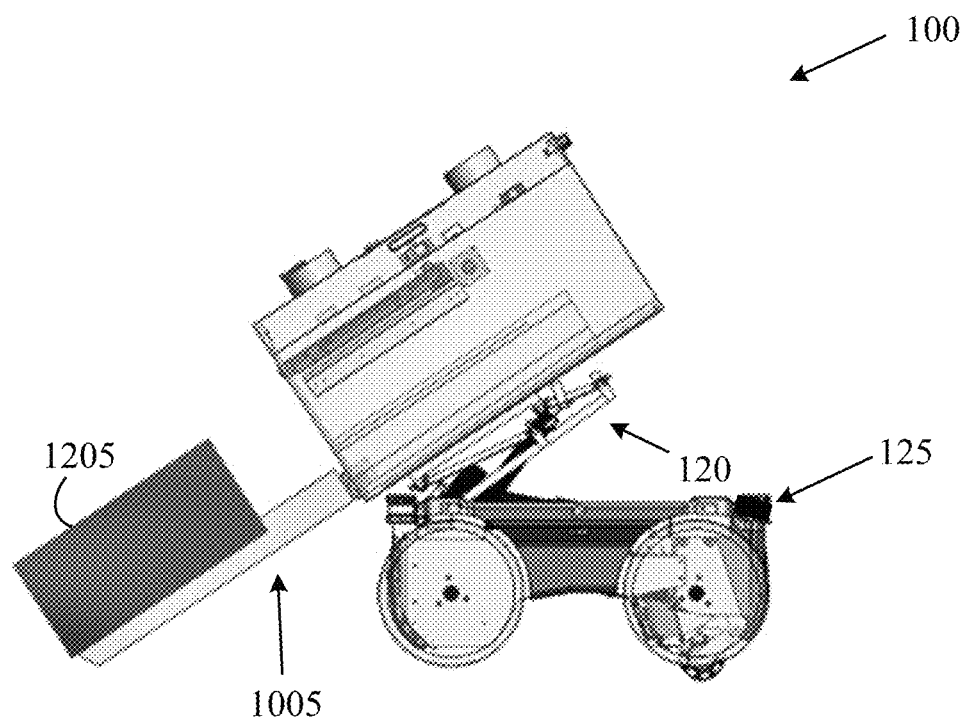
FIG. 12 illustrates a second example operation of the robotic vehicle when delivering a package in accordance with the disclosure.

FIG. 11 and FIG. 12 illustrate an example operation of the robotic vehicle 100 when delivering a package 1205 in accordance with the disclosure. FIG. 11 illustrates the tray 1005 placed in a tilted position as may be desirable when delivering the package 1205 illustrated in FIG. 12. The tray 1005 may be placed in the tilted position under control of the first controller 125. More particularly, the first controller 125 may issue commands to the four-bar linkage assembly 120 and to one or more actuators for lifting a front end of the chassis 115 over a first tilt angle and for moving the four-bar linkage assembly 120 to provide a second tilt angle that orients the tray 1005 for sliding the package 1205 downwards towards a package drop-off surface (the ground or an unloading dock, for example).

Figure 13:
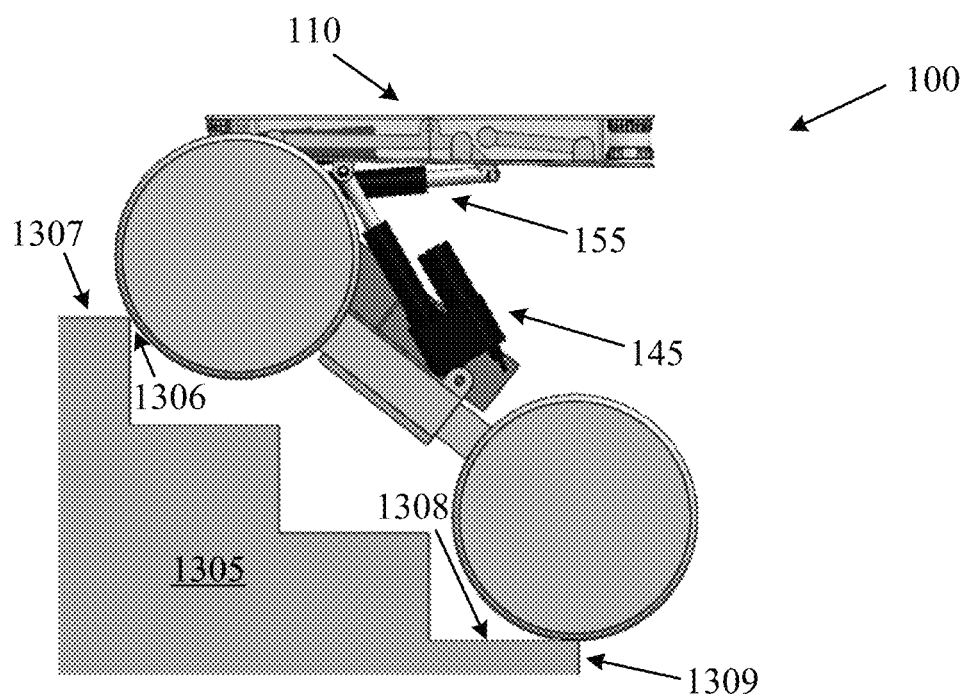
FIG. 13 illustrates an example operation of the robotic vehicle when traversing a stair structure in accordance with an embodiment of the disclosure.

FIG. 13 illustrates an example operation of the robotic vehicle 100 when traversing a stair structure 1305 in accordance with an embodiment of the disclosure. In this illustration, a first separation distance between a leading edge 1306 of a fourth step 1307 and a flat portion 1308 of a first step 1309 exceeds a second separation distance between the first section 116 of the chassis 115 and the second section 117 of the chassis 115, where the second separation distance corresponds to a retracted condition of the chassis 115. The second controller 130 may evaluate an image captured by the camera 140 and convey information about the fourth step 1307 to the first controller 125. The first controller 125 may evaluate this information along with additional information that may be received from other sensors (radar, sonar, LIDAR, etc.) and determine that the chassis 115 needs to be extended in order for the robotic vehicle 100 to traverse the stair structure 1305.

Consequently, the first controller 125 may issue commands to the fourth actuator 305 and/or the fifth actuator 310 (shown in FIG. 3) for placing the chassis 115 in the extended condition (shown in FIG. 4). When in the extended condition, a separation distance between the first pair of wheels attached to the first section 116 and the second pair of wheels that is attached to the second section 117 of the chassis 115 is increased thereby providing greater stability to the robotic vehicle 100, for example, by distributing a center of gravity of the robotic vehicle 100 over a larger area. The first controller 125 may also operate the four-bar linkage assembly 120 and/or one or more actuators (such as the first actuator 145 and the second actuator 155) to retain the dual-functionality deck 110 (and/or the package housing module 505) in a horizontal position (parallel to the ground) when the robotic vehicle 100 is traversing the stair structure 1305.

Figure 14:
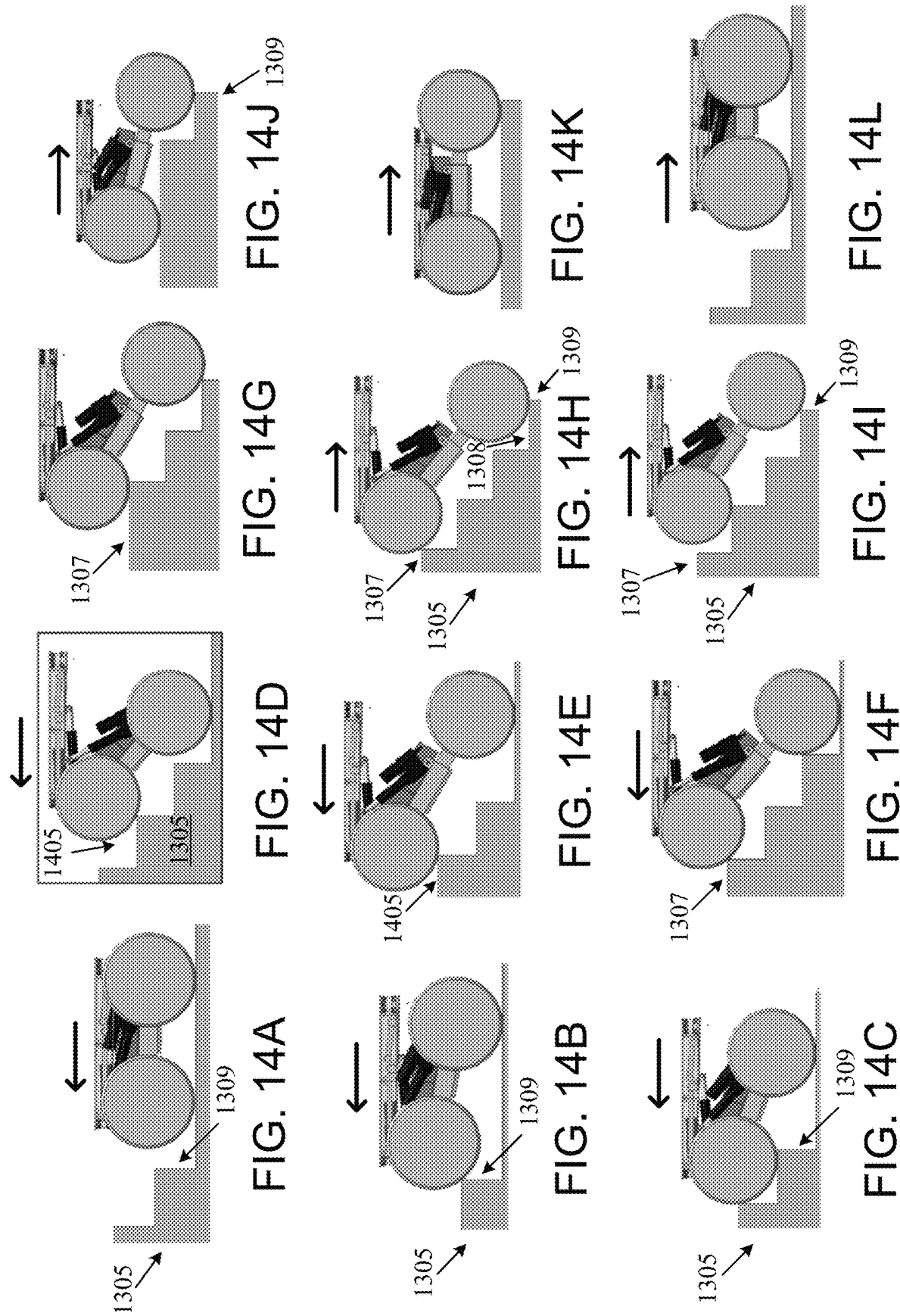
FIG. 14A illustrates the robotic vehicle approaching the stair structure.
FIG. 14B illustrates the robotic vehicle having reached the stair structure and proceeding to climb the stair structure.
FIG. 14C illustrates the robotic vehicle having moved one step up on the stair structure.
FIG. 14D illustrates the robotic vehicle having moved one more step up on the stair structure.
FIG. 14E illustrates the first pair of wheels that are attached to the first section of the robotic vehicle being located upon the front edge of a second step.
FIG. 14F illustrates the first pair of wheels that are attached to the first section of the robotic vehicle being located upon the front edge of the fourth step.
FIG. 14G illustrates the robotic vehicle having moved one more step up on the stair structure.
FIG. 14H illustrates the robotic vehicle moving down the stair structure.
FIG. 14I illustrates the robotic vehicle having moved one step down on the stair structure.
FIG. 14J illustrates the robotic vehicle having moved one more step down on the stair structure.
FIG. 14K illustrates the robotic vehicle having cleared the stair structure and moving away from the stair structure.
FIG. 14L illustrates the robotic vehicle moving further away from the stair structure.

FIGS. 14A through 14L illustrate an operational sequence of the robotic vehicle 100 when traversing the stair structure 1305 in accordance with an embodiment of the disclosure. FIG. 14A illustrates the robotic vehicle 100 approaching the stair structure 1305. At this stage, the chassis 115 of the robotic vehicle 100 may be retained in a retracted condition.

FIG. 14B illustrates the robotic vehicle 100 having reached the stair structure 1305 and proceeding to climb the stair structure 1305. At this stage, the first pair of wheels that are attached to the first section 116 of the robotic vehicle 100 are located upon a front edge of the first step 1309. The second pair of wheels that are attached to the second section 117 of the chassis 115 are located upon a flat surface in front of the stair structure 1305. The chassis 115 of the robotic vehicle 100 may be retained in a retracted condition at this stage.

FIG. 14C illustrates the robotic vehicle 100 having moved one step up on the stair structure 1305. The first pair of wheels that are attached to the first section 116 of the robotic vehicle 100 are located upon a flat top surface of the first step 1309. The second pair of wheels that are attached to the second section 117 of the chassis 115 are located upon a flat surface in front of the stair structure 1305. The chassis 115 of the robotic vehicle 100 may be retained in a retracted condition at this stage.

FIG. 14D illustrates the robotic vehicle 100 having moved one more step up on the stair structure 1305. The first pair of wheels that are attached to the first section 116 of the robotic vehicle 100 are located upon a front edge of a second step 1405. The second pair of wheels that are attached to the second section 117 of the chassis 115 are located upon a flat surface in front of the stair structure 1305. The chassis 115 of the robotic vehicle 100 may be retained in a retracted condition at this stage.

FIG. 14E illustrates the first pair of wheels that are attached to the first section 116 of the robotic vehicle 100 being located upon a front top surface of the second step 1405. At this time, the first controller 125 may evaluate one or more images provided by the camera 140 and/or various sensors and determine that the next step (the fourth step 1307 shown in FIG. 13) may necessitate placing the chassis 115 of the robotic vehicle 100 in an extended condition.

FIG. 14F illustrates the first pair of wheels that are attached to the first section 116 of the robotic vehicle 100 being located upon the front edge of the third step 1307. The second pair of wheels that are attached to the second section 117 of the chassis 115 are located upon a flat surface in front of the stair structure 1305. However, at this time, the first controller 125 has activated the fourth actuator 305 and/or the fifth actuator 310 (shown in FIG. 3) to place the chassis 115 of the robotic vehicle 100 in an extended condition.

FIG. 14G illustrates the robotic vehicle 100 having moved one more step up on the stair structure 1305. The first pair of wheels that are attached to the first section 116 of the robotic vehicle 100 are located upon a flat surface of the third step 1307. The second pair of wheels that are attached to the second section 117 of the chassis 115 are now located upon the flat surface of the first step. The robotic vehicle 100 may continue to move forward up the stair structure 1305 with the chassis 115 in an extended condition until the stair structure 1305 has been traversed.

In an example scenario, the first controller 125 may revert the chassis 115 to a retracted condition for a first period of time while climbing up the stair structure 1305 in response to detecting some other features of the stair structure 1305 (such as for example, a landing that is located part-way up the stair structure 1305). The first controller 125 may then place the chassis 115 in the extended condition for a second period of time in response to detecting some additional steps of the stair structure 1305 that may necessitate traversal by use of the extended condition.

The procedure described above with respect to moving up the stair structure 1305 may be executed in reverse fashion when the robotic vehicle 100 is moving down the stair structure 1305. Thus, for example, FIG. 14H illustrates the robotic vehicle 100 moving down the stair structure 1305. At this juncture, the chassis 115 is in an extended condition, the first pair of wheels are resting upon a front edge of the fourth step 1307 and the second pair of wheels are resting upon the flat portion 1308 of the first step 1309.

FIG. 14I illustrates the robotic vehicle 100 having moved one step down on the stair structure 1305. The chassis 115 is in an extended condition.

FIG. 14J illustrates the robotic vehicle 100 having moved one more step down on the stair structure 1305. The chassis 115 is in an extended condition.

FIG. 14K illustrates the robotic vehicle 100 having cleared the stair structure 1305 and moving away from the stair structure 1305. At this juncture, the chassis 115 may be in an extended condition.

FIG. 14L illustrates the robotic vehicle 100 moving further away from the stair structure 1305. At this juncture, the chassis 115 may be moved to the retracted condition.

It must be understood with reference to FIG. 14A through FIG. 14L that the stair structure 1305 is merely one example structure where the robotic vehicle 100 can operate with a transitioning of the chassis 115 from a retracted condition to an extended condition (and vice-versa). However, the transitioning feature of the chassis 115 is equally applicable to other structures having undulations and elevation variations such as, for example, ground terrain (an unpaved path, a paved path in a yard or garden path, a boulder-strewn terrain, a hilly countryside, a surface of a planetary body, etc.). Furthermore, it must be understood that the transitioning feature of the chassis 115 of the robotic vehicle 100 is applicable not only to a wheeled implementation of the robotic vehicle 100 (as described herein) but is equally applicable to a robotic vehicle equipped with components such as, for example, treads, chains, belts, legs, or stilts in place of, or in addition, to wheels.

Figure 15:
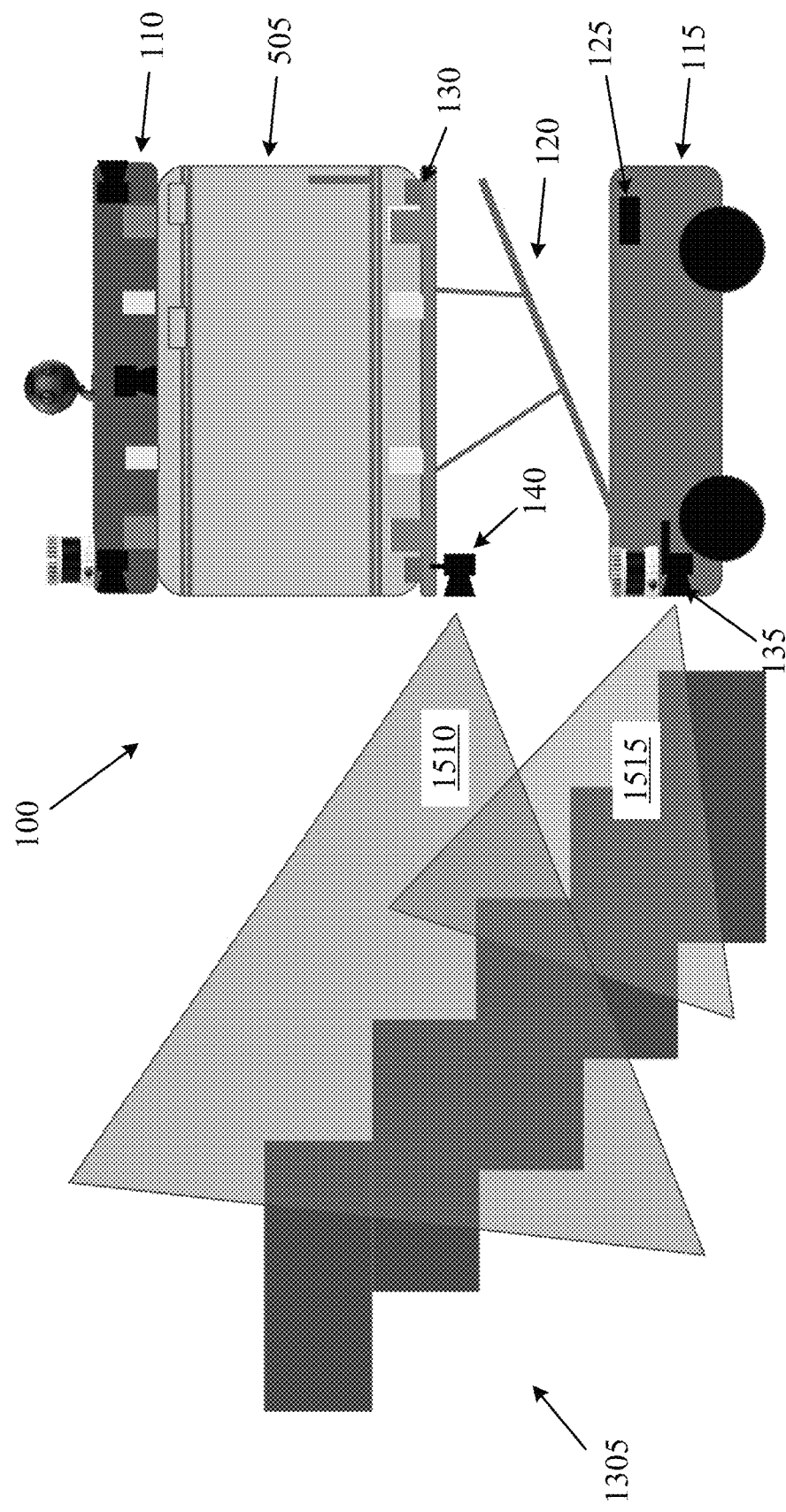
FIG. 15 illustrates an example scenario where the robotic vehicle evaluates the stair structure prior to moving up the stair structure.

FIG. 15 illustrates an example scenario where the robotic vehicle 100 performs a stair evaluation procedure upon the stair structure 1305 prior to moving up the stair structure 1305. In another example scenario, the robotic vehicle 100 may perform the stair evaluation procedure of the stair structure 1305 while moving up the stair structure 1305. As a part of the stair evaluation procedure, the camera 135 may be configured by the first controller 125 to capture one or more images of a lower portion of the stair structure 1305. The camera 140 provided on the dual-functionality deck 110 of the robotic vehicle 100 may be configured by the second controller 130 to capture one or more images of an upper portion of the stair structure 1305. In the illustrated scenario, the camera 135 is configured to have a field of view 1515 that encompasses the lower portion of the stair structure 1305. The dual-functionality deck 110 has been placed in a raised condition to configure the second camera to have a field of view 1510 that encompasses the upper portion of the stair structure 1305.

In some cases, the second controller 130 may communicate and coordinate with the first controller 125 for executing the image capture procedure. The images may include depth information for constructing a digital 3D model of the stairs. The images captured by the camera 135 and/or the camera 140 may be conveyed to the first controller 125. The first controller 125 may evaluate the images to obtain various types of information about the stair structure 1305 such as, for example, dimensions of the stair structure 1305

(height, width, number of steps, steepness, angle of elevation, etc.) dimensions (height, depth, etc.) of each step, shape of each step, and traction provided by each step (dry, wet, cement, concrete, etc.). The first controller 125 may then use the information to make a determination whether to place the chassis 115 in either an extended condition or a retracted condition in order to climb the stair structure 1305. The first controller 125 may configure the dual-functionality deck 110 to either remain in the raised condition or may be lowered, based on various factors, when the robotic vehicle 100 moves up the stair structure 1305. Some example factors may pertain to maintaining a stability of the robotic vehicle 100.

Figure 16:
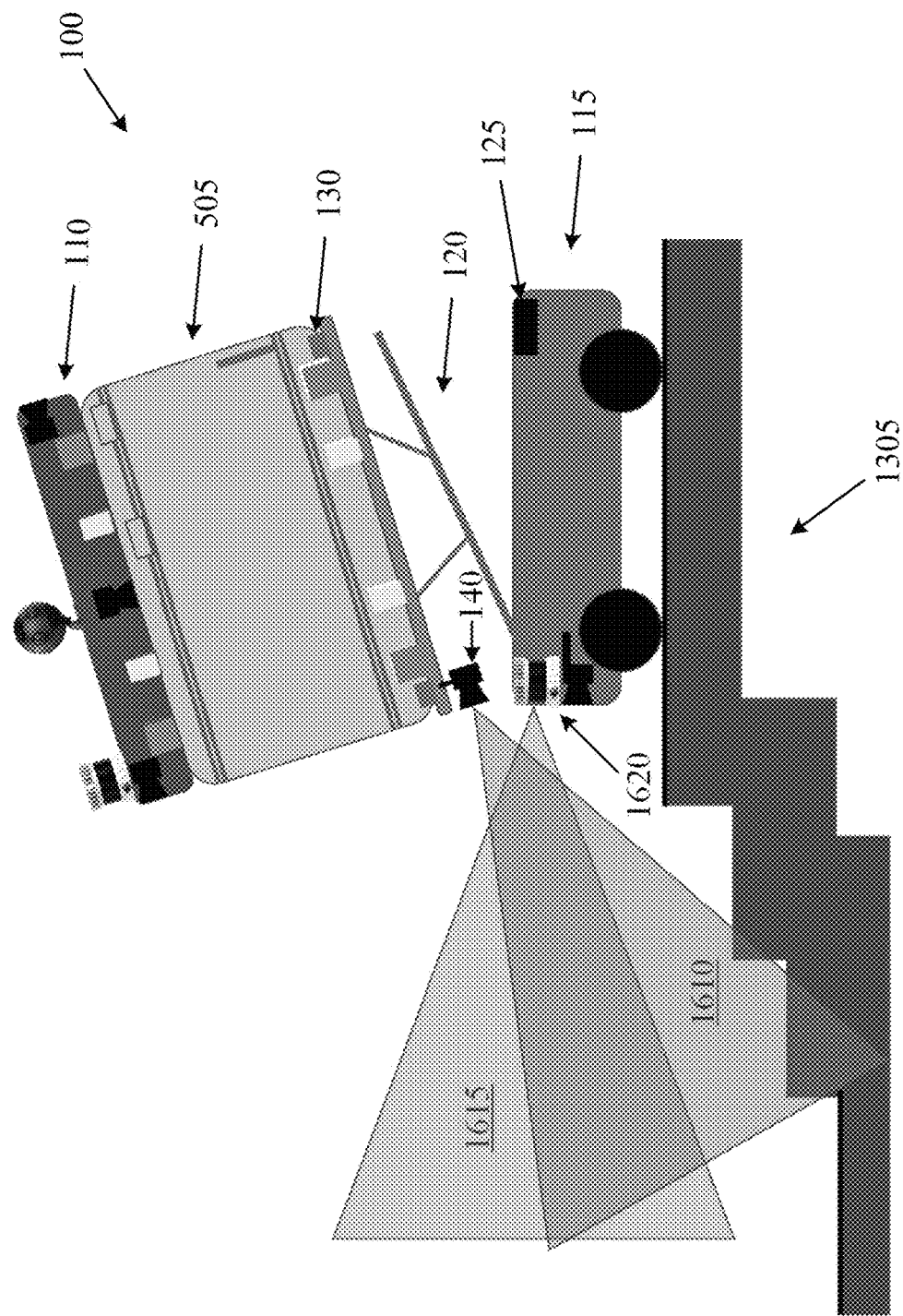
FIG. 16 illustrates an example scenario where the robotic vehicle evaluates the stair structure prior to moving down the stair structure.

FIG. 16 illustrates an example scenario where the robotic vehicle 100 evaluates the stair structure 1305 prior to moving down the stair structure 1305. In this illustrated scenario, a radar sensor 1620 is provided on the chassis 115 and is used for detecting various types of obstacles that may be present in a movement path of the robotic vehicle 100. The radar sensor 1620 has a coverage area 1615. The dual-functionality deck 110 has been placed in a tilted condition to configure the camera 140 to have a field of view 1610 that encompasses at least some steps of the stair structure 1305.

The second controller 130 may communicate and coordinate with the first controller 125 for executing an image capture procedure of the steps of the stair structure 1305 and convey the captured images to the first controller 125. The first controller 125 may evaluate the images and/or information obtained from the radar sensor 1620 to obtain various types of information about the stair structure 1305 such as, for example, dimensions of the stair structure 1305 (height, width, number of steps, steepness, angle of elevation, etc.) dimensions (height, depth, etc.) of each step, shape of each step, and traction provided by each step (dry, wet, cement, concrete, etc.). The first controller 125 may then use the information to make a determination whether to place the chassis 115 in either an extended condition or a retracted condition in order to travel down the stair structure 1305.

The first controller 125 may configure the dual-functionality deck 110 to either remain in the raised condition or may be lowered, based on various factors, when the robotic vehicle 100 moves down the stair structure 1305. Some example factors may pertain to maintaining a stability of the robotic vehicle 100.

Figure 17C:
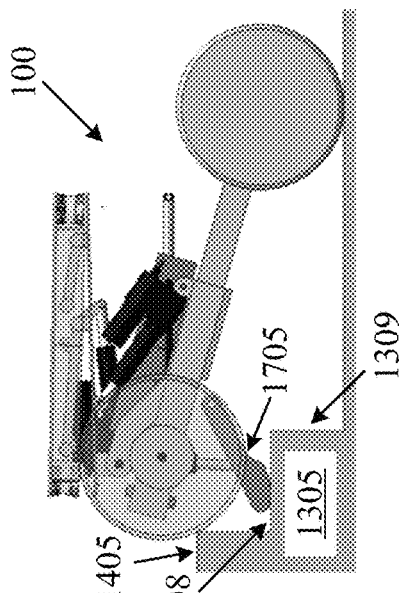
FIG. 17A through FIG. 17F illustrate an operational sequence of the robotic vehicle when using a pair of flippers to traverse a stair structure in accordance with an embodiment of the disclosure.
Figure 17A:
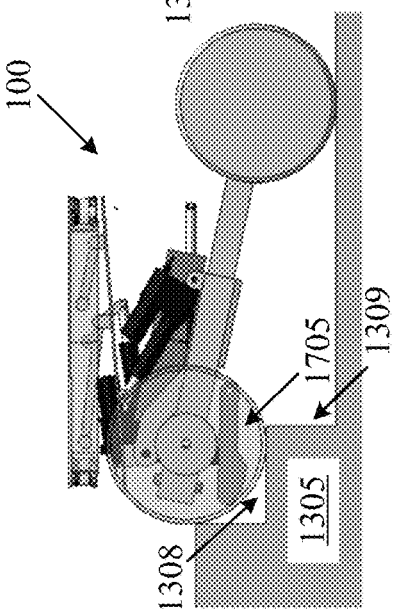
Figure 17E:
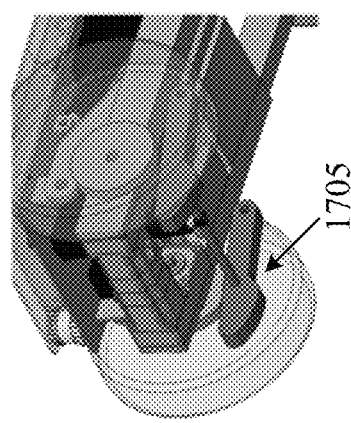
Figure 17D:
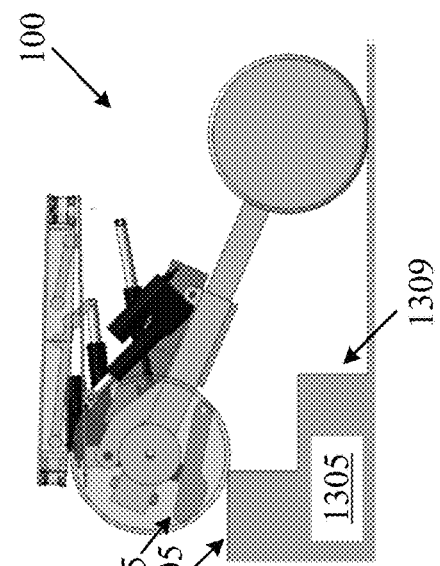
Figure 17B:
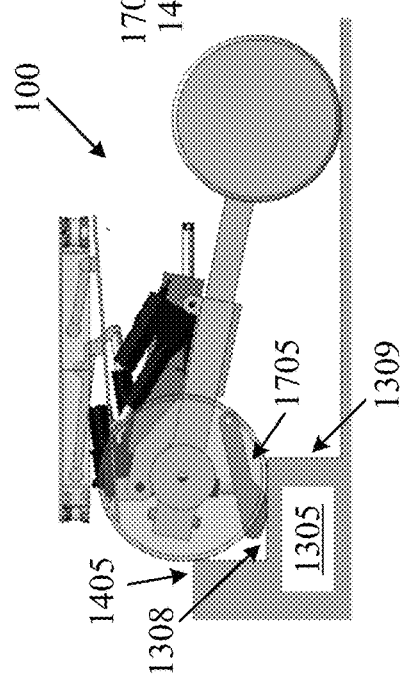

FIG. 17A through FIG. 17F illustrate an operational sequence of the robotic vehicle 100 when using a pair of flippers 1705 to traverse the stair structure 1305 in accordance with an embodiment of the disclosure. A single flipper may be used in some other implementations. The pair of flippers 1705 may be attached to an axle that is provided in an underside portion of the robotic vehicle 100. The axle on which the pair of flipper 1705 are mounted may be oriented in parallel with another axle on which the first pair of wheels of the robotic vehicle 100 are mounted. One or more actuators such as, for example, an actuator 1710 that is shown in FIG. 17B may be operated under control of the first controller 125 that can be provided in the chassis 115 of the robotic vehicle 100. More particularly, the actuator(s) are configured to cause the pair of flippers 1705 to rotate over an arcuate angle 1715. When in an unactuated condition, the pair of flippers 1705 that are illustrated in this example embodiment, may be oriented parallel to a major plane of the underside of the chassis 115 as illustrated in FIG. 17A. When actuated, the pair of flippers 1705 that are illustrated in this example embodiment, rotate in a counter-clockwise direction. The pair of flippers 1705 can be actuated to enable the robotic vehicle 100 to traverse the stair structure 1305 in some scenarios.

FIG. 17C shows the pair of flippers 1705 in an unactuated condition. The first pair of wheels of the robotic vehicle 100 are located on the flat portion 1308 of the first step 1309.

FIG. 17D shows the pair of flippers 1705 in an actuated condition. In this example actuated condition, the pair of flippers 1705 have rotated counter-clockwise over an arcuate angle that is less than the arcuate angle 1715. In this actuated condition, a leading portion of each of the first pair of flippers 1705 are located on the flat portion 1308 of the first step 1309. The first pair of wheels of the robotic vehicle 100 are located on the flat portion 1308 of the first step 1309.

FIG. 17E shows the pair of flippers 1705 further rotated in a counter-clockwise direction over the arcuate angle 1715. A toe portion of the first pair of flippers 1705 is now located on the flat portion 1308 of the first step 1309. The first pair of wheels of the robotic vehicle 100 are lifted above the flat portion 1308 of the first step 1309 as a result of the pair of flippers 1705 having rotated over the arcuate angle 1715. More particularly, a portion of the first pair of wheels of the robotic vehicle 100 are making contact upon a front edge of the second step 1405 at this moment and the robotic vehicle 100 continues to move forward.

Figure 17F:
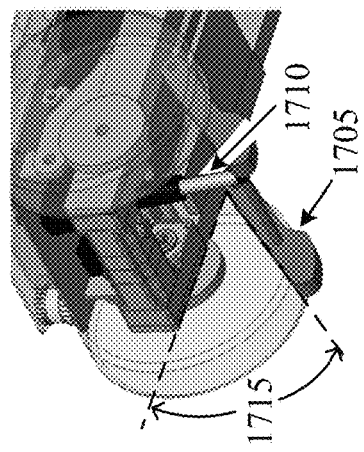

FIG. 17F shows the pair of flippers 1705 rotated in a clock-wise back to the unactuated position after the robotic vehicle 100 has moved forwards. The first pair of wheels of the robotic vehicle 100 are now located on the flat portion of the second step 1405.

The procedure described above is repeated for additional steps of the stair structure 1305 as the robotic vehicle 100 continues to climb up the stair structure 1305. The procedure described above may be executed in a reverse order when the robotic vehicle 100 moves down the stair structure 1305.

FIG. 18 illustrates a tilting feature that may be provided by the robotic vehicle 100 in accordance with an embodiment of the disclosure. The tilting feature may be employed when the robotic vehicle 100 is moving on an inclined surface 1805 so as to avoid tipping over. The first controller 125 provided in the chassis 115 of the robotic vehicle 100 may evaluate data captured by an IMU (Inertial Measurement Unit) to determine the gradient of the inclined surface 1805 and whether the gradient exceeds a threshold angle. The threshold angle can be predetermined, for instance, based on the maximum design load, highest allowable center of mass, and lateral distance between the wheels of the robot. This parameter can be stored in the memory of the first controller 125. Upon making the determination, the first controller 125 may operate one or more actuators coupled to the four-bar linkage assembly 120 in order to tilt the package housing module 505 over an angle with respect to the chassis 115 of the robotic vehicle 100. A vertical axis 1810 of the package housing module 505 may be angularly oriented with respect to a horizontal plane 1815 that corresponds to a flat ground surface. In the illustrated example scenario, the angular orientation 1820 is orthogonal. In another example scenario, the angular orientation 1820 of the vertical axis 1810 may be less than, or greater than, 90 degrees so as to counter-balance the chassis 115 of the robotic vehicle 100 and prevent the robotic vehicle 100 from toppling over.

FIG. 19 illustrates another tilting feature that may be provided by the robotic vehicle 100 in accordance with an embodiment of the disclosure. In this case, the first controller 125 may operate one or more actuators coupled to the four-bar linkage assembly 120 to tilt the package housing module 505 and to raise the package housing module 505 to a desired height. Raising the package housing module 505 may be necessary when unloading a package. However, this will reduce the stability to the robotic vehicle 100 by raising a center of gravity of the robotic vehicle 100.

FIG. 20 illustrates yet another tilting feature that may be provided by the robotic vehicle 100 in accordance with an embodiment of the disclosure. In this case, the first controller 125 may operate one or more actuators coupled to the four-bar linkage assembly 120 for placing the chassis 115 in a parallel orientation with respect to the horizontal plane 1815 that corresponds to a flat ground surface. This titling feature may be particularly advantageous when the robotic vehicle 100 is moving up or down the stair structure 1305 described above.

Figure 21:
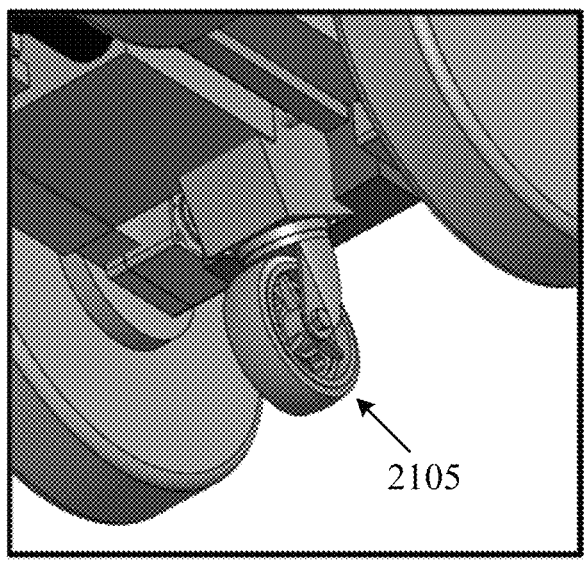
FIG. 21 shows a caster wheel that may be operated for pivoting the robotic vehicle in accordance with an embodiment of the disclosure.

FIG. 21 shows a caster wheel 2105 that may be operated for pivoting the robotic vehicle 100 in accordance with an embodiment of the disclosure. When deployed, the caster wheel 2105 allows the robotic vehicle 100 to execute a turn having a tight turn radius. The turn can be executed in either a clockwise direction or in a counterclockwise direction and can be performed when the robotic vehicle 100 is moving in either a forward direction or in a backward direction. Further details about the caster when 2105 and its operation are provided below.

Figure 22:
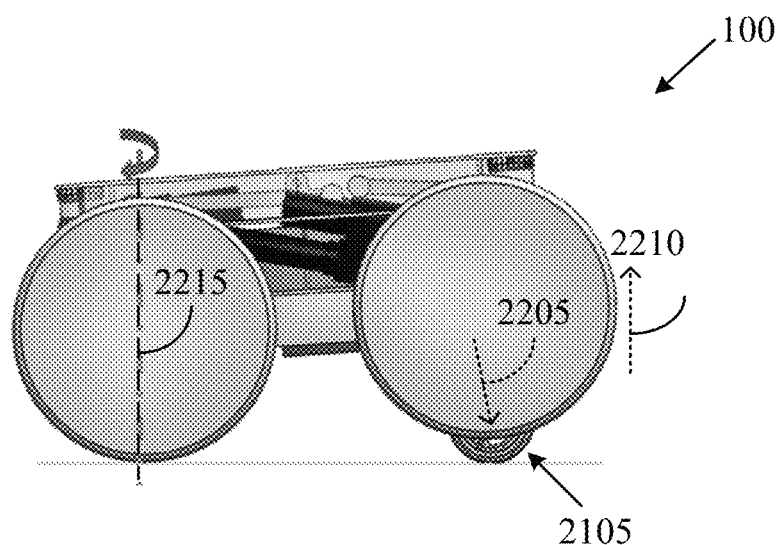
FIG. 22 shows a first example implementation of a robotic vehicle having a caster wheel in accordance with the disclosure.

FIG. 22 illustrates a first example implementation, where the caster wheel 2105 is coupled to an actuator that is attached to the underside of the chassis 115 at a location that is substantially centered with respect to an axle on which the second pair of wheels of the robotic vehicle 100 are mounted (rear side of the robotic vehicle 100). The first controller 125 may activate the actuator to move the caster wheel 2105 from a retracted position to a deployed position. When in the retracted position, the second pair of wheels are in contact with the travel surface and the robotic vehicle 100 can move on all four wheels in either a forward or a backward direction. A longitudinal axis of the axle on which the second pair of wheels are mounted (and/or the axle on which the first pair of wheels are mounted) may be oriented under control of the first controller 125 to be aligned with any angle over a specific angular range in order to allow the robotic vehicle 100 to make turns having a turn radius that is generally arcuate in nature.

The first controller 125 may deploy the caster wheel 2105 by activating the actuator to move the caster wheel 2105 so as to make contact with the travel surface. The action of the actuator further applies downwards pressure upon the caster wheel 2105 (as indicated by arrow 2205) and causes the second pair of wheels of the robotic vehicle 100 to lift off the travel surface (as indicated by arrow 2210). The first controller 125 may then rotate the caster wheel 2105 to a desired angle that allows the robotic vehicle 100 to turn around a vertical axis that is indicated by an arrow 2215. The turn radius provided by this operation is tighter than a turn radius provided by the axle of the second pair of wheels in the manner described above.

Figure 23:
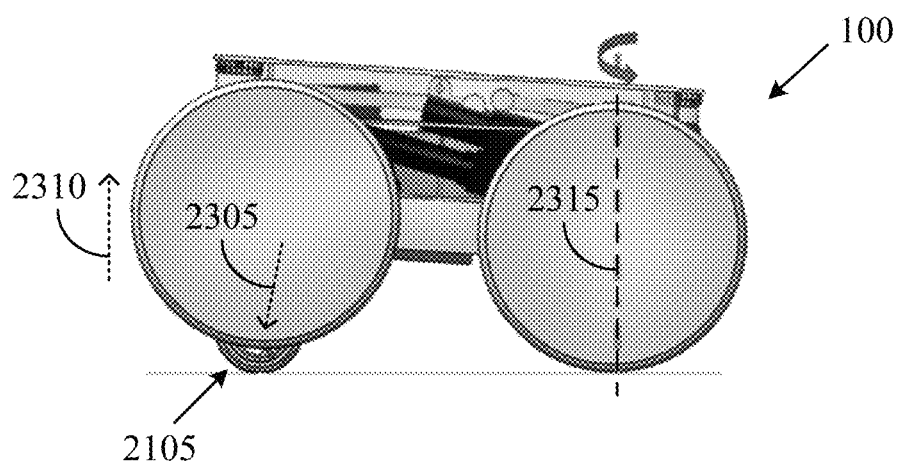
FIG. 23 shows a second example implementation of a robotic vehicle having a caster wheel in accordance with the disclosure.

FIG. 23 illustrates a second example implementation, where the caster wheel 2105 is coupled to an actuator that is attached to the underside of the chassis 115 at a location that is substantially centered with respect to an axle on which the first pair of wheels of the robotic vehicle 100 are mounted (front side of the robotic vehicle 100). The first controller 125 may activate the actuator to move the caster wheel 2105 from a retracted position to a deployed position. When in the retracted position, the first pair of wheels are in contact with the travel surface and the robotic vehicle 100 can move on all four wheels in either a forward or a backward direction. A longitudinal axis of the axle on which the first pair of wheels are mounted) may be oriented under control of the first controller 125 to be aligned with any angle over a specific angular range in order to allow the robotic vehicle 100 to make turns having a turn radius that is generally arcuate in nature.

The first controller 125 may deploy the caster wheel 2105 by activating the actuator to move the caster wheel 2105 so as to make contact with the travel surface. The action of the actuator further applies downwards pressure upon the caster wheel 2105 (as indicated by arrow 2305) and causes the first pair of wheels of the robotic vehicle 100 to lift off the travel surface (as indicated by arrow 2310). The first controller 125 may then rotate the caster wheel 2105 to a desired angle that allows the robotic vehicle 100 to turn around a vertical axis that is indicated by an arrow 2315. The turn radius provided by this operation is tighter than a turn radius provided by the first pair of wheels in the manner described above.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as a memory provided in the first controller 125 and/or the second controller 130 can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method to operate a robotic vehicle, the method comprising:
    detecting, by the robotic vehicle, a stair structure located on a traversal path of the robotic vehicle;
    evaluating, by the robotic vehicle, the stair structure;
    modifying, by the robotic vehicle, a longitudinal dimension of a chassis of the robotic vehicle based on evaluating the stair structure; and
    traversing the stair structure based on modifying the longitudinal dimension of the chassis of the robotic vehicle.

2. The method of claim 1, wherein modifying the longitudinal dimension of the chassis of the robotic vehicle comprises:
    modifying, by the robotic vehicle, a separation distance between a first wheel that is attached to a first section of the chassis of the robotic vehicle and a second wheel that is attached to a second section of the chassis of the robotic vehicle.

3. The method of claim 2, wherein traversing the stair structure comprises:
    actuating, by the robotic vehicle, a flipper to rotate over an arcuate angle for raising at least the first wheel to prevent contact between the first wheel and a step in the stair structure, and to enable the flipper to make contact with the step in the stair structure for providing traction to the robotic vehicle.

4. The method of claim 2, further comprising:
    removing, by an individual, a dual-functionality deck that is mounted upon a four-bar linkage assembly attached to a top surface of the first section of the chassis;

mounting, by the individual, a package housing module upon the four-bar linkage assembly in place of the dual-functionality deck; and placing, by the individual, the dual-functionality deck upon a top surface of the package housing module, the dual-functionality deck operative as a lid.

5. The method of claim 4, further comprising:

placing, by the individual, a package inside the package housing module;

detecting, by the robotic vehicle, a movement of the package inside the package housing module when traversing the stair structure; and operating, by the robotic vehicle, the four-bar linkage assembly to modify an orientation of the package housing module in response to detecting the movement of the package inside the package housing module.

6. The method of claim 5, wherein placing the package inside the package housing module comprises:

activating, by the robotic vehicle, a slide-out conveyor configured for moving the package or a bin into the package housing module;

mounting, by the individual, the package upon the slide-out conveyor; and retracting, by the robotic vehicle, the slide-out conveyor to move the package into the package housing module.

7. The method of claim 6, further comprising:

operating, by the robotic vehicle, the four-bar linkage assembly to align an axis of the package housing module with a package drop-off surface; and activating, by the robotic vehicle, the slide-out conveyor configured for moving the package out of the package housing module and on to the package drop-off surface.

* * * * *